United States Patent [19]
Saito

[11] Patent Number: 5,442,739
[45] Date of Patent: Aug. 15, 1995

[54] IMAGE PROCESSING INCLUDING CUT AND PASTE EDITING

[75] Inventor: Akira Saito, Tokyo, Japan

[73] Assignee: Kabushiki Kaisha Toshiba, Kawasaki, Japan

[21] Appl. No.: 125,655

[22] Filed: Sep. 23, 1993

[30] Foreign Application Priority Data

Oct. 2, 1992 [JP] Japan .................. 4-264730
Sep. 17, 1993 [JP] Japan .................. 5-231457

[51] Int. Cl.⁶ ............................................. G06F 15/62
[52] U.S. Cl. ............................................. 395/138
[58] Field of Search .............. 395/138, 161, 155, 131, 395/133, 134, 139, 128, 145; 369/419.17; 382/47, 56

[56] References Cited
U.S. PATENT DOCUMENTS
5,339,387 8/1994 Frankel ............................. 395/131
5,341,466 8/1994 Perlin et al. ....................... 395/139

FOREIGN PATENT DOCUMENTS
3256454 11/1991 Japan.

*Primary Examiner*—Phu K. Nguyen
*Attorney, Agent, or Firm*—Cushman, Darby & Cushman

[57] ABSTRACT

An image is encoded/decoded in blocks of m×n pixels. The phase of a cutout position on an original image with respect to a block is stored. Cut and paste editing is performed so that the phase of a paste position specified on an image to be edited may coincide with the stored phase. Alternatively, cut and paste editing is performed such that an image is cut out along its block boundaries and the cutout image is pasted on an edit image along its block boundaries, so that the occurrence of image quality degradation due to reencoding of an image subjected to cut and paste editing is avoided.

5 Claims, 9 Drawing Sheets

IMAGE PROCESSING INCLUDING CUT AND PASTE EDITING

BACKGROUND OF THE INVENTION

1. Field of the Invention

The present invention relates to an image processing device in which, when performing cut and paste editing of a first image on a second image, the first image has undergone pixel blocking operations for compression and expansion, and the second image pasted with the first image will also undergo pixel blocking operations for compression and expansion.

2. Description of the Related Art

Recently JPEG (Joint Photographic Expert Group) recommended a standardization algorithm for encoding images in units of blocks of 4×4 pixels, 8×8 pixels, etc. This is an algorithm for image data encoding and decoding, i.e., data compression and expansion for color still images and gray-scale still images.

The basic system of the algorithm is irreversible transformation of compression and expansion. For compression, discrete cosine transformation (DCT), quantization and entropy encoding are carried out in sequence. For expansion, on the other hand, entropy decoding, reverse quantization and reverse DCT are carried out in sequence. Some other encoding systems using DCT have been proposed (see, as an example, Japanese Patent Application KOKAI Publication No. 3-256454). DCT is a well-known technique described in, for example, NIKKEI ELECTRONICS, Oct. 15, 1990, (no. 511) pp 124 to 129. In JPEG system the images are encoded in units of blocks each of which is constituted by a block of m×n pixels. The encoding is performed for each block. In this specification, explanation is made of a block of m=8, n=8. In the JPEG basic system, which is an irreversible transformation system, even if the processes of compression, retention and expansion are repeated for the same image, no degradation of the quality of a reencoded image will occur as long as the block boundaries for dividing image pixels into blocks remain unchanged.

However, problems arise when an attempt is made to further compress and retain a composite image formed by cut and paste editing of compressed, expanded images. Assuming that a first image is blocked in units of 8×8 pixels for subsequent compression. To cut out an image from the first image, the size of 4 blocks×5 blocks, from the blocked first image, it will be cut out along the block boundaries for coding as shown. After the cut image has been pasted on a second image, the resultant composite image is divided into blocks when compressed by reencoding. In this case, the block boundaries of the pasted image will not coincide with the block boundaries of the composite image. The reason for this is that, in pasting the cut image on the second image, their block boundaries are invisible to an operator. If it happened that the block boundaries of the images coincided and the scale factors of the images were identical to each other, no image quality degradation due to reencoding would occur. If, however, cut and paste editing were performed in a state where the block boundaries of the images do not coincide with each other, then the image quality would degrade with each repetition of the processes of cut and paste editing, compression, retention, and expansion.

Consider now the phase of a coordinate position at each block boundary of the cut and paste image with respect to the block boundaries of the second image. When the first and second images and are not coincident with each other in block boundary, i.e., phase before and after cut and paste, such image quantity degradation as described above will occur. Note here that, when one block for coding has a size of 8 pixels×8 pixels, the phase is represented by the lower-order three bits of the X, Y coordinates of each pixel of the first image within each block of the second image and takes values from (0, 0) to (7, 7) each represented by three bits. Here, (0, 0) and (7, 7) indicate phase positions.

SUMMARY OF THE INVENTION

In view of the drawbacks that image quality degrades when the processes of cut and paste of blocked images, compression and expansion of a composite image obtained by cut and paste processing of blocked images are repeated, it is an object of the present invention to provide an image processing device which permits the occurrence of image quality degradation to be avoided in repeating encoding and decoding of image data in block units each comprising pixels in the form of a matrix.

According to an aspect of the present invention there is provided an image processing apparatus comprising: display means having first and second display areas for displaying an image corresponding to image data, wherein the image displayed on the first display area may be displayed on the second display area; encoding and decoding means for encoding image data to be displayed on the display means in units of blocks each having m×n pixels and for decoding image data of the image displayed on the display means in units of blocks each having m×n pixels; means for calculating coordinates (x, y) so as to satisfy relationships: X mod m=x mod m, Y mod n=y mod n, where, (X, Y) represent coordinates of a first point of the image displayed on the first display area and (x, y) represent coordinates of a second point corresponding to the first point of the image displayed on the second display area when the image displayed on the first display area is displayed on the second display area; and control means for displaying the image displayed on the first display means on the second display means in accordance with the second coordinates (x, y) calculated by the calculating means so as to encode and decode the same image data in units of blocks of m×n pixels by the encoding and decoding means.

According to the other aspect of the present invention there is provided an image processing device in which image data is encoded and decoded in blocks of a predetermined number of pixels, comprising: first display means for displaying an original image; first display memory for storing the original image; second display means for displaying an image to be edited; second display memory for storing the image to be edited; first specifying means for specifying a cutout position on the first display means; first changing means for changing to block boundary coordinates near the upper left cutout position specified by the first specifying means; second specifying means for specifying a paste position on the second display means; second changing means for changing to block boundary coordinates near the upper left cutout position specified by the first specifying means; and processing means for reading a cutout image on the first display means from the first memory using the cutout position specified by the first changing means and storing the cutout image read in the second display memory using the paste position obtained by the second changing means.

In the image processing device of the present invention, in which image data is encoded/decoded in blocks of a predetermined number of pixels, an original image is displayed on the first display means, the original image is stored in the first display memory, an edit image to be edited is displayed on the second display means, the edit image is stored in the second display memory, a cutout position on the first display means is specified by the first specifying means, the cutout position coordinates within a block are stored in the storage means, a paste position on the second display means is specified by the second specifying means, the paste position coordinates within a block are changed to the coordinates stored in the storage means by the changing means, the cutout image on the first display means is read from the first display memory using the cutout position specified by the first specifying means, and the read cutout image is stored in the second display memory using the paste position obtained by the changing means.

Further, in the image processing device of the present invention, in which image data is encoded/decoded in blocks of a predetermined number of pixels, an original image is displayed on the first display means, the original image is stored in the first display memory, an edit image to be edited is displayed on the second display means, the edit image is stored in the second display memory, a cutout position on the first display means is specified by the first specifying means, the cutout position specified is changed to near block boundary coordinates by the first changing means, a paste position on the second display means is specified by the second specifying means, the paste position specified is changed to near block boundary coordinates by the second changing means, the cutout image on the first display means is read from the first display memory using the cutout position obtained by the first changing means, and the read cutout image is stored in the second display memory using the paste position obtained by the second changing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
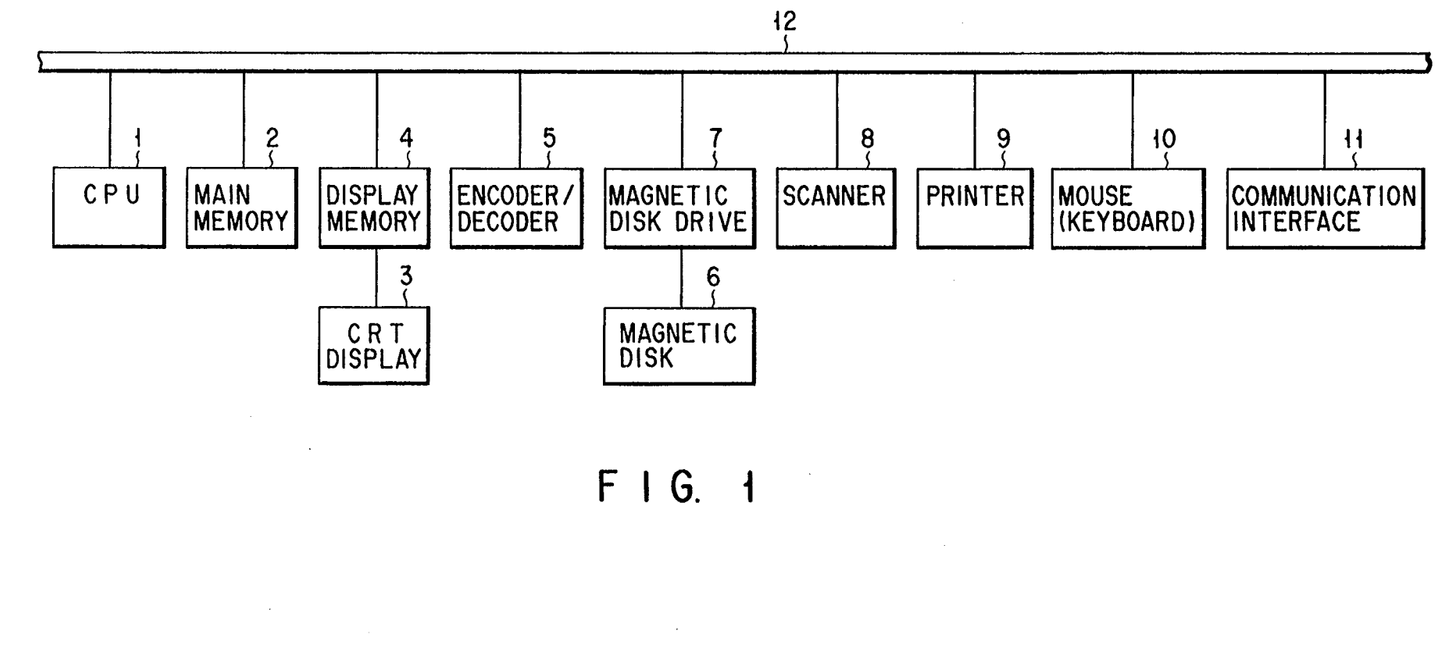
FIG. 1 is a schematic block diagram of an image processing device according to an embodiment of the present invention.

FIG. 1 is a simplified block diagram of an image processing system embodying the present invention. The image processing system comprises a CPU (central processing unit) 1, a main memory 2 storing a control program executed by the CPU 1, a CRT display 3 for displaying images, a display memory 4 for storing images to be displayed on the CRT 3, an encoder/decoder 5 for encoding and decoding image data, a magnetic disk 6 storing images, a magnetic disk drive 7 for driving, for example, a hard disk, a scanner 8 for reading an original image, a printer 9 for providing hard copy output of displayed information, a mouse (or keyboard) 10 serving as an input device for specifying an edit mode or cutout and paste coordinates, a communication interface 11 for a network for connection to external equipment, and a bus 12 for connecting the various parts of the system.

In place of the magnetic disk 6 use may be made of another type of storage medium, for example, an optical disk device (ODD) or a remote file connected to the communication interface 11 via the network.

In the encoder/decoder 5, a display image is handled as comprising 640×512 pixels. The brightness of a single pixel is represented by 8 bits and its color component (I, Q) is represented by 4 bits. The 640×512 pixels are processed in blocks of 8×8 pixels.

The encoder/decoder 5 comprises an encoder for encoding an input image on a block-by-block basis and a decoder for converting (decoding) the encoded image to its original form on a block-by-block basis. The detail of the encoder/decoder is described in, for example, Japanese Unexamined Patent Publication No. 3-256454 and thus its description is omitted herein.

The encoder/decoder 5 reads a file stored in the magnetic disk 6 and decodes it for display.

The image data is loaded into the display memory 4 from the scanner 8 or the network connected to the communication interface 11 and then displayed on the CRT display 3. At the time of compression and retention, the image data stored in the display memory 4 is encoded by the encoder/decoder 5 and then written on the magnetic disk 6 in the magnetic disk drive 7. At the time of expansion, on the other hand, the encoded data is read from the magnetic disk 6 in the magnetic disk drive 7 and then decoded by the encoder/decoder 5 to the original image data, and it is sent to the display memory 4.

For the cut and paste editing, a user (operator) operates the mouse 10 while watching the CRT display 3.

Figure 2A:
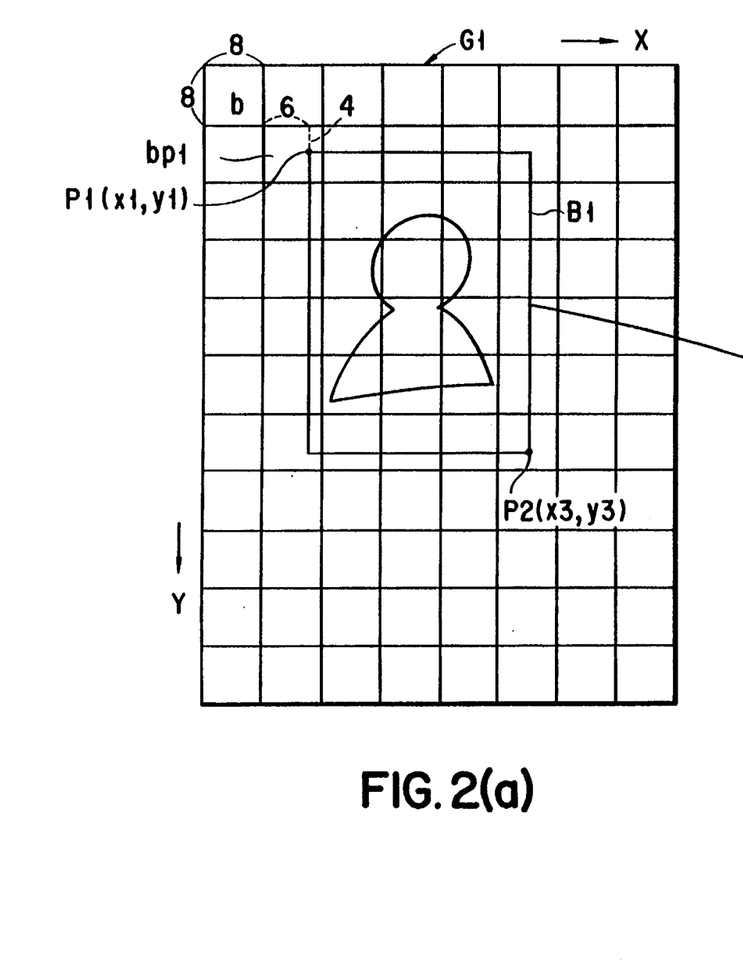
FIG. 2(a) and 2(b) illustrate a cutout image and an image pasted with the cutout image on the CRT display of FIG. 1.

The principle of the present editing system will be described with reference to FIGS. 2a and 2b. FIG. 2a shows a displayed image on the CRT 3 which has been obtained by decoding encoded image data read from the magnetic disk 6 in the magnetic disk drive 7 and then stored in the display memory 4. The displayed image G1 has been blocked into units of 8×8 pixels when it is decoded by the encoder/decoder 5. In the figure, there are 8 blocks b, each with 8×8 pixels, in the X direction and 11 blocks in the Y direction. To cut out an image portion B1 from the image G1, the operator uses the mouse 10 to store the coordinates (x1, y1) of a specific point of the image B1 (for example, the point P1 in its upper left corner) on the display memory 4 in the main memory 2 by clicking while watching the CRT display 3.

The phase of the point P1 with respect to the block boundaries of the block bp1 involving the point P1 is obtained and then stored. The phase is represented by the position of that pixel which is located at the point P1 within the block bp1. In the case of FIG. 2a, since each block has a size of 8×8 pixels, the phase can be represented by the three low-order bits of the X, Y coordinates. Supposing the pixel in the upper left corner of the block bp1 to have (0, 0), the position (phase) of the pixel at the point P1, which is the sixth pixel in the X direction and the fourth pixel in the Y direction, will be represented by (6, 4).

Next, the operator uses the mouse 10 to address the point P1 in the upper left corner and the point P2 in the lower right corner of the image B1 on the display memory 4 by clicking, so that data for the image B1 is read out. The image B1 is then moved to an edit image G2, which has previously been displayed on the CRT 3, and registered with it using the mouse 10. If, in this case, the edit image G2 was read from the magnetic disk 6, it has been divided into blocks of 8×8 pixels by the encode/decode process. However, the block boundaries of the edit image G2 on the CRT display 3 are invisible to the user. Even if the point P1 is placed in a desired position on the image G2 and the image B1 is pasted on the image B1 with a click of the mouse's button, therefore, it is very seldom that the phase of the upper left point P1 of the image G1 with respect to the block bp2 of the image G2 coincides with the phase (6, 4) in the block bp1 of the image G1. With the point P1 located within the block bp2 of the image G2, the pasting is performed and registration of block boundaries is then performed in the manner which will be described later.

Figure 2B:
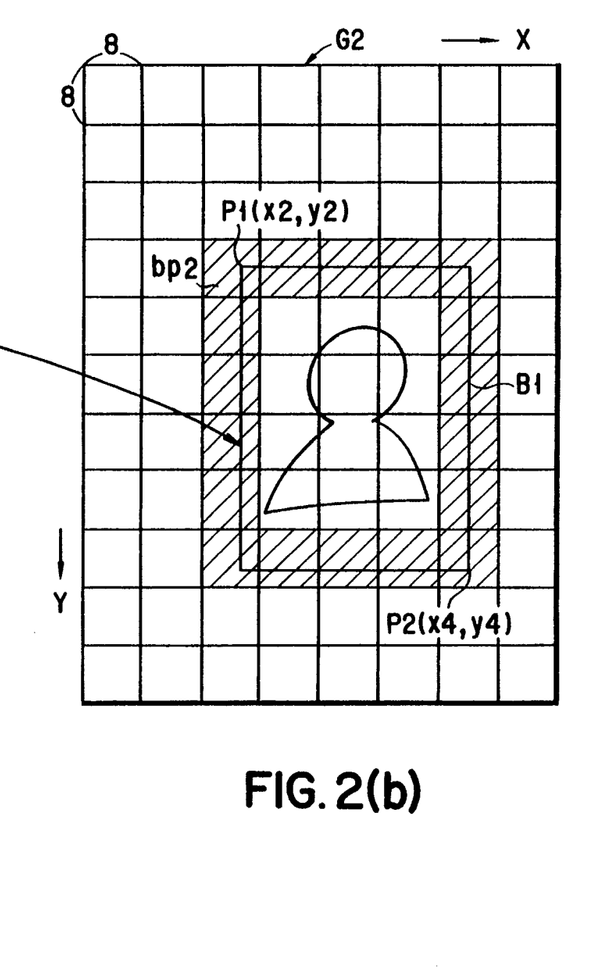

The cutout image B1 and the edit image G2 are mixed in the blocks shown shaded in FIG. 2b. Thus, image quality degradation due to reencoding of that composite image may occur. However, no quality degradation will occur because the 3×4 unshaded blocks of the cutout image B1 surrounded by the shaded blocks retain the block boundaries as they were at the time the image G1 was encoded.

If the resolution of the image G2 is 16 pixels/mm, then the shaded areas composed of 8×8 pixel blocks will have a width of 0.5 mm in either of the X, Y directions. Even if the registration of the block boundaries is performed within the width of 0.5 mm, therefore, the operator will scarcely notice that the position specified by himself or herself has been changed. Thus, the registration is not a serious problem.

The coordinate calculations for bringing the cutout image B1 in registration with the blocks of the edit image G2 are performed as follows.

Assume here that the block size is 8×8 pixels.

In general, the phase of a point P(x, y) (x, y indicate the x, y coordinates of the point) on the cutout image is obtained as (x mod 8, y mod 8) (mod indicated a Modulus operation)

Assuming the upper-left, upper-right, lower-left and lower-right phase coincidence positions of the block surrounding the point to be P1, P2, P3, and P4, respectively and the distances between P and P1, between P and P2, between P and P3 and between P and P4 to be d1, d2, d3, and d4, respectively, the nearest phase coincidence position of the block for the point P is obtained by the minimum distance $$\min(d1, d2, d3, d4)$$

The distance d1 between P(x, y) and P1(x1, y1) is given by $$d1 = [(x-X1)2 + (y-y1)2]^{\frac{1}{2}}$$

The remaining distances d2, d3 and d4 are likewise obtained.

Figure 3:
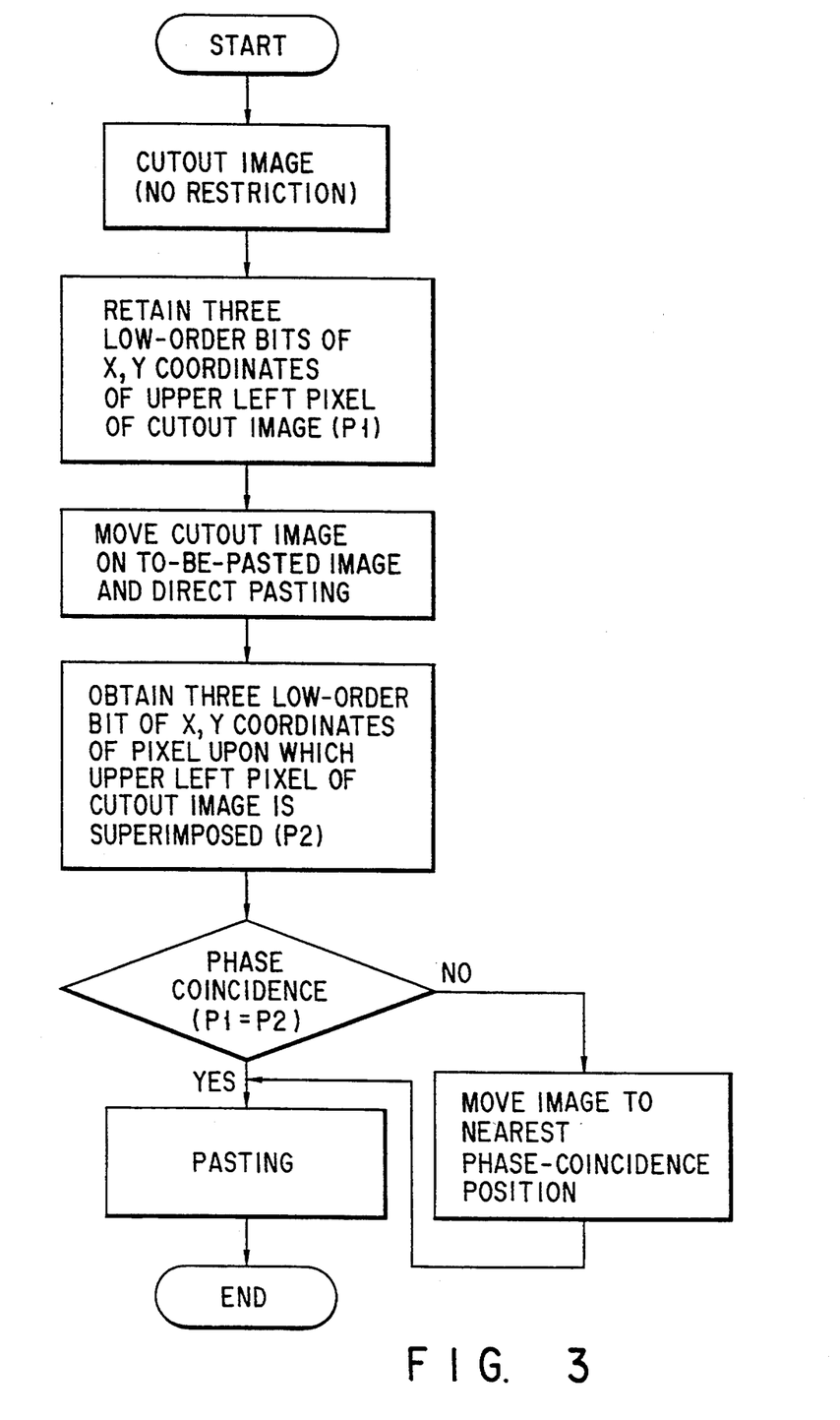
FIG. 3 a flowchart for the cut and paste operation of the image processing device of FIG. 1.

Hereinafter, the cut and paste operation of the above-described arrangement will be described with reference to a flowchart shown in FIG. 3 and state transition diagrams shown in FIGS. 4A through 4E.

Figure 4A:
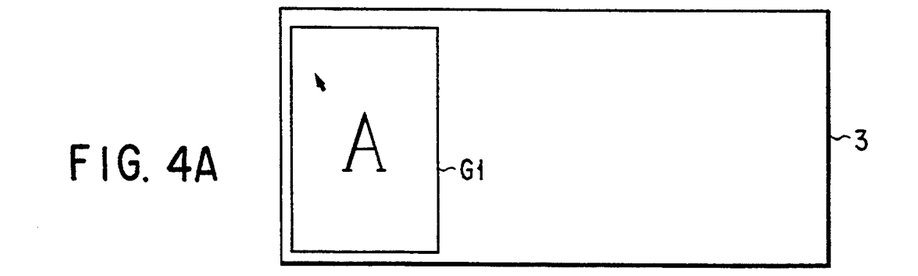
FIGS. 4A to 4E are state transition diagrams for use in explanation of the cutout and paste operation of the image processing device of FIG. 1.
Figure 4B:
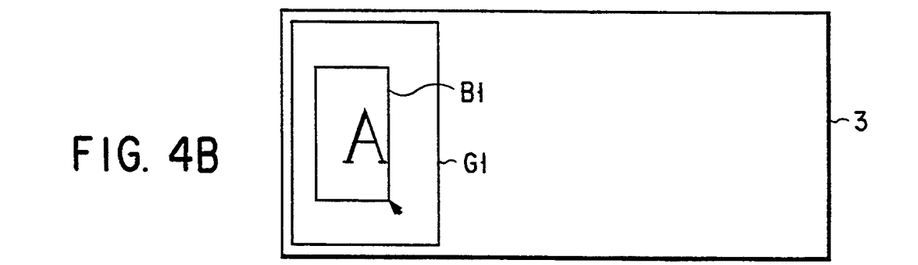

Image data read by the scanner 8 from an original, image data decoded by the encoder/decoder 7 after readout from the magnetic disk 6 or image data externally supplied via the communication interface 11 is stored in the display memory 4 and consequently it is displayed as an image G1 on the CRT display 3 (refer to FIG. 4A).

In such a state, the operator uses the mouse 10 to select cut and paste as an editing mode. Then, through the CRT display 3 the CPU 1 prompts the operator to make a choice between the cut and paste in the same image and the cut and paste for different images.

When the cut and paste for different images is selected by the operator with a click of the mouse 10, the CPU 1 prompts the operator to read another image, through the CRT display 3. In response to the prompt, the operator uses the mouse to instruct the CPU to display a different image G2. The different image G2 may be an image read by the scanner 8, an image decoded by the encoder/decoder 8 after readout from the magnetic disk 6, or an image externally supplied via the communication interface 11.

Figure 4C:
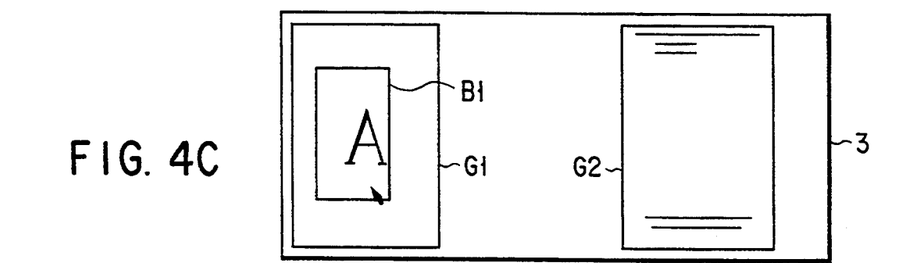
Figure 4D:
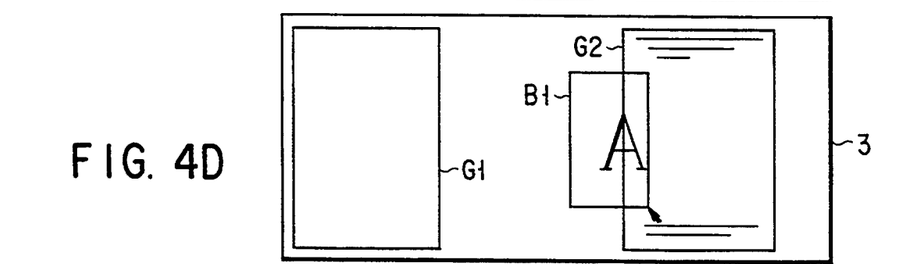
Figure 4E:
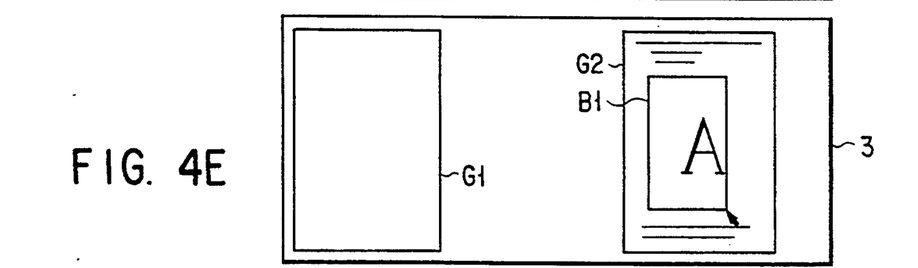

Thus, two different images G1 and G2 are displayed on the CRT display 3 as shown in FIG. 4C.

Next, the CPU 1 displays the prompt "Move the cursor to the upper left point of an image portion to be cut out and then select execution" on the CRT display 3. In response to this prompt, the operator moves the cursor to the upper left point of a cutout portion within which the image [A] is displayed and then clicks the mouse (refer to FIG. 4A). Thereby, the CPU 1 is notified of the coordinates of a point defining a cutout image portion.

Subsequently, the CPU 1 displays the prompt "Move the cursor to the lower right point of an image portion to be cut out and then select the execution" on the CRT display 3. In response to this prompt, the operator moves the cursor to the lower right point of a cutout portion within which the image [A] is displayed and then clicks the mouse (refer to FIG. 4B).

Image data within a cutout portion defined by the coordinates of the upper left and lower right points thus specified is stored as a cutout image B1 in the main memory 2 by the CPU 1. Also, the CPU 1 stores the coordinate data of three low-order bits for the upper left point of the cutout image B1 in the main memory 2 as the relative position within a unit block (the coordinates within a block). For example, in the case of FIG. 2a, the X, Y coordinates of the point P1 as the relative position within the unit block bp1 are (6, 4).

Next, when an image move mode is selected by the mouse 10, the CPU 1 displays the prompt "Select an image to be moved, move it to a position in which the image is pasted, and then selects execution" on the display 3. In response to this prompt, the operator selects the image B1 to be moved by clicking the mouse, moves it to a desired position within the image G2 and then selects the execution by clicking the mouse (refer to FIGS. 4C, 4D and 4E).

The CPU 1 then makes a comparison between the three low-order bits of the coordinates of the upper left point of the paste area in the image G2 and the three low-order bits of the coordinates of the upper left point of the cutout image B1 which have been stored in the main memory 2. When the phase comparison indicates equality, the paste position is made valid. If, on the other hand, the phase comparison indicates no equality, then a position on the nearest block in which phase coincidence occurs is obtained and that position is made valid.

Thereby, the CPU 1 reads an image for a cutout area from the display memory 4 and stores it in that location of the main memory which corresponds to the paste position.

As described above, the image processing device is arranged to store the phase of a cutout image and paste the image in a position in which a coincidence occurs between the block boundary of an image to be pasted with the cutout image and the phase of the cutout image. Therefore, no image quality degradation occurs in the shaded blocks as well as in the unshaded blocks surrounded by the shaded blocks in FIG. 2b because their block boundaries at the time of reencoding coincide with those at the time of the previous encoding.

As an alternative, when the paste position is specified, the movement of the cursor may be controlled in such a way that it moves discontinuously from a position in which phase coincidence occurs to the next position in which phase coincidence occurs. This will provide the same results. For example, in place of the step of moving the cutout image on the edit image and directing the pasting of the cutout image on the edit image in the flowchart of FIG. 3, it may be arranged so as to obtain the three low-order bits of the X, Y coordinates of a pixel of an edit image upon which the pixel in the upper left corner of a cutout image is superimposed and move the cutout image until a position in which a phase coincidence occurs is reached.

If done so, phase coincidence will occur in any position to which movement is allowed. Thus, the operator is allowed to direct the pasting anywhere.

As a further alternative, an image may be cut out so that its boundaries may coincide with the boundaries of encoding blocks. Since the block size is 8×8 pixels, the image will be cut out with the three low-order bits of each of the X, Y coordinates set between 7 and 0.

The three low-order bits of each of the X, Y coordinates of the pixel in the upper left corner of a cutout image are always (0, 0) and the three low-order bits of each of the X, Y coordinates of the lower-right pixel of the cutout image are always (7, 7).

Figure 5A:
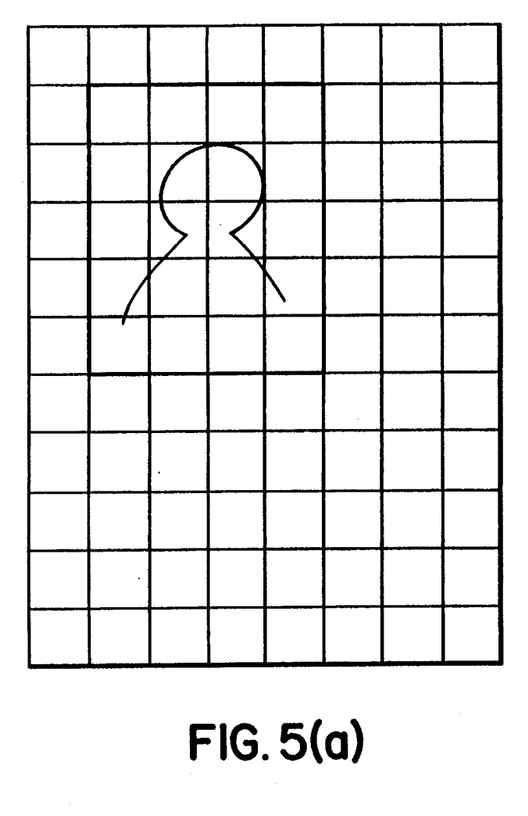
FIG. 5(a) and 5(b) illustrate a cutout image and an image pasted with the cutout image on the CRT display of FIG. 1.
Figure 5B:
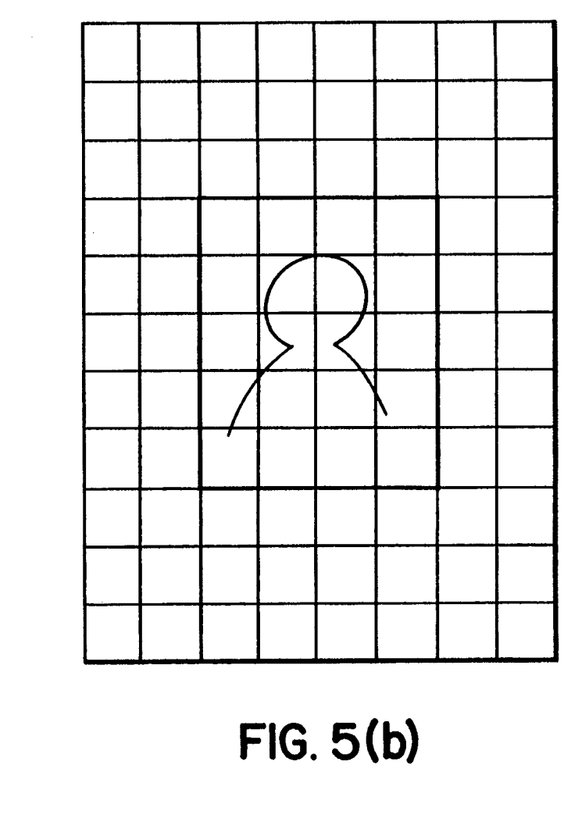

Next, the cutout image is moved onto an image to be pasted with the cutout image and brought in registration with the to-be-pasted image. Like the cutout, the pasting is performed along block boundaries. For example, the pixel of the to-be-pasted image upon which the upper left pixel of the cutout image is to be superimposed must have the X, y coordinates (0, 0). An example of the cutout image and the to-be-pasted image is illustrated in FIGS. 5a and 5b.

Consider now the reencoding of a composite image thus formed. All the blocks have the same boundaries as at the previous encoding time and thus no phase inconsistency occur. Therefore, no image quality degradation occurs even if the processes of compression, retention, expansion, and editing are repeated.

Figure 6:
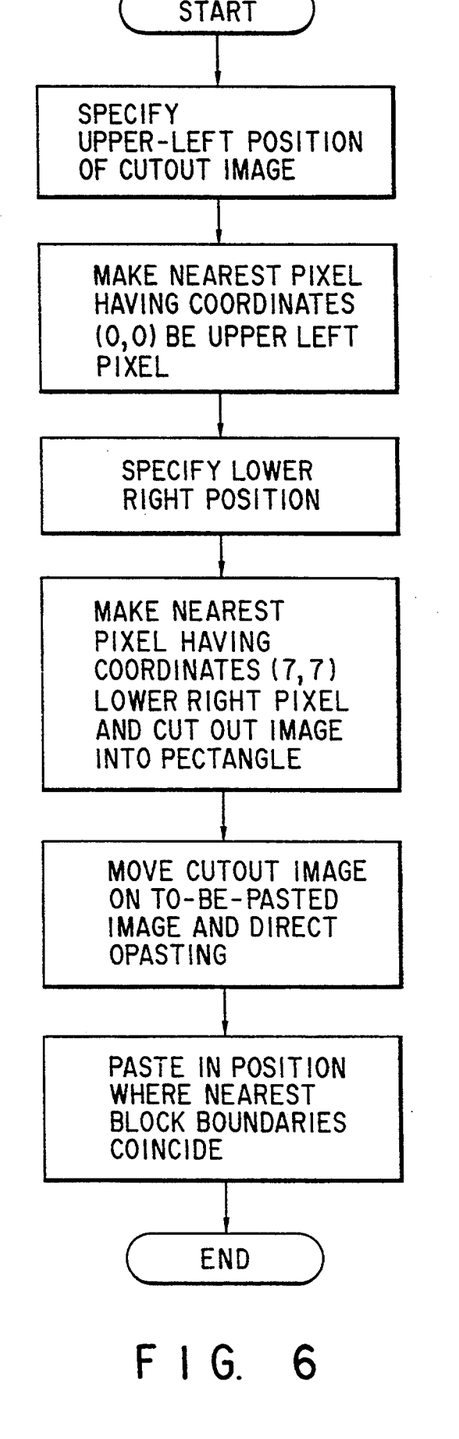
FIG. 6 is a flowchart for the cut and paste operation of the image processing device of FIG. 1.

Next, the operation of the above-described arrangement will be described with reference to a flowchart shown in FIG. 6 and state transition diagrams shown in FIGS. 4A through 4E.

An image G1, which may be an image read by the scanner 8, an image decoded by the encoder/decoder 7 after readout from the magnetic disk 6, or an image externally supplied through the communication interface 11, is stored in the display memory 4 and is now being displayed on the CRT display 3.

In such a state, the operator uses the mouse 10 to select the cut and paste of image as an editing mode. Then, the CPU 1 prompts, through the CRT display 3, the operator to make a choice between the cut and paste in the same image and the cut and paste for different images.

When the operator selects the cut and paste for different images with a click of the mouse 10, the CPU 1 prompts the operator to read out another image, through the CRT display 3. In response to this prompt, the operator directs the CPU 1 to display a different image G2 by clicking the button on the mouse 10. The different image may be an image read out by the scanner 8, an image decoded by the encoder/decoder after readout from the magnetic disk 6, or an image externally supplied through the communication interface 11. As a result, two images G1 and G2 will be displayed on the CRT display 3 as shown in FIG. 4C.

Next, the CPU 1 displays the prompt "Move the cursor to the upper left corner of the image to be cut out and then direct execution" on the CRT display 3. In response to this prompt, the operator uses the mouse 10 to specify the upper left point of a portion to be cut out within the displayed image (refer to FIG. 4A). In this case, the pixel that is near the specified point and has (0, 0) as the three low-order bits of the X, Y coordinates is selected as the upper right point of the cutout image portion. Such a pixel exists every eighth pixel.

Subsequently, the CPU 1 displays the prompt "Move the cursor to the lower right point of the image to be cut out and then direct execution" on the CRT display 3. In response to this prompt, the operator uses the mouse 10 to specify the lower right point of a portion to be cut out within the displayed image (refer to FIG. 4B). In this case, the pixel that is near the specified point and has (7, 7) as the three low-order bits of the X, Y coordinates is selected as the lower right point of the cutout image portion.

The cutout area defined by the coordinates thus specified is stored in the main memory 2 by the CPU 1.

Next, when the image move mode is selected by the mouse 10, the CPU 1 displays the prompt "Select an image to be moved, move it to an area where it is pasted, and then select execution" on the CRT display 3. In response to the prompt, the operator uses the mouse to select the image to be moved, move it to the position where pasting is performed and select execution (refer to FIGS. 4C, 4D and 4E). In this case, as described above, the pixel that is near the specified point and has (0, 0) as the three low-order bits of the X, Y coordinates is selected as the upper right point of the cutout image portion. The pixel that is near the specified point and has (7, 7) as the three low-order bits of the X, Y coordinates is selected as the lower right point of the cutout image portion.

Thus, the CPU 1 reads an image corresponding to the cutout portion from the display memory 4 and stores it in those locations of the display memory 4 which correspond to that area where the cutout image is pasted.

As described above, the image cut and paste editing is performed such that an image is cut out with blocks for encoding used as boundaries and it is then pasted with the blocks taken as boundaries. Namely, the image is cut out and then pasted in accordance with block boundaries. Thus, blocks for reencoding remain the same as those at the previous encoding time. Thus, image quality degradation due to phase inconsistency will not occur.

The same results will be achieved by placing a restriction, in specifying a paste position, on the movement of the cursor such that it discontinuously moves from a position where the conditions are met to the next position where the conditions are met. If done so, the conditions will be met in any position to which movement is allowed.

In this case, restrictions are made on the selection of paste position. That is, the paste position is set in units of eight pixels, not in units of one pixel. This is not a serious problem, for the eight pixels correspond to a small value, say, 1 mm in the case of a resolution of 8 pixels/mm, and 0.5 mm in the case of 16 pixels/mm. In practice, such restrictions cannot be said to be great.

Depending on systems, image data is represented by R, G and B and undergoes transformation into a coordinate system comprising Y, U and V (brightness, colors), accompanied by subsampling prior to encoding. In this case, it will be necessary to change the block size to meet the contents of the subsampling.

Figure 7A:
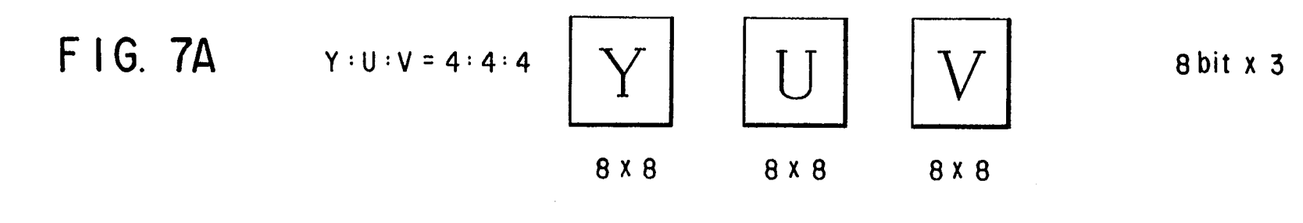
FIGS. 7A, 7B and 7C shows image data examples when color difference signals are subjected to subsampling.
Figure 7B:
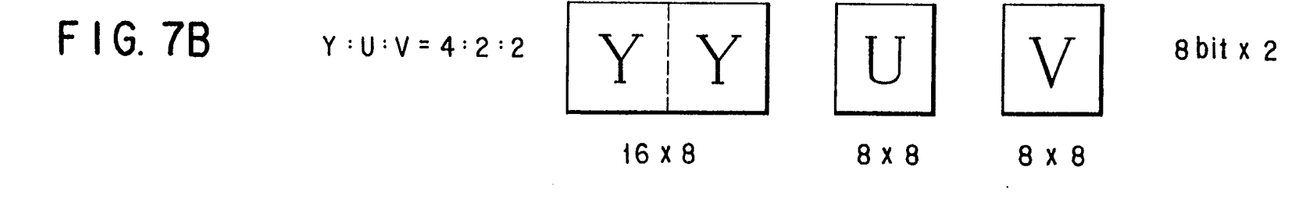
Figure 7C:
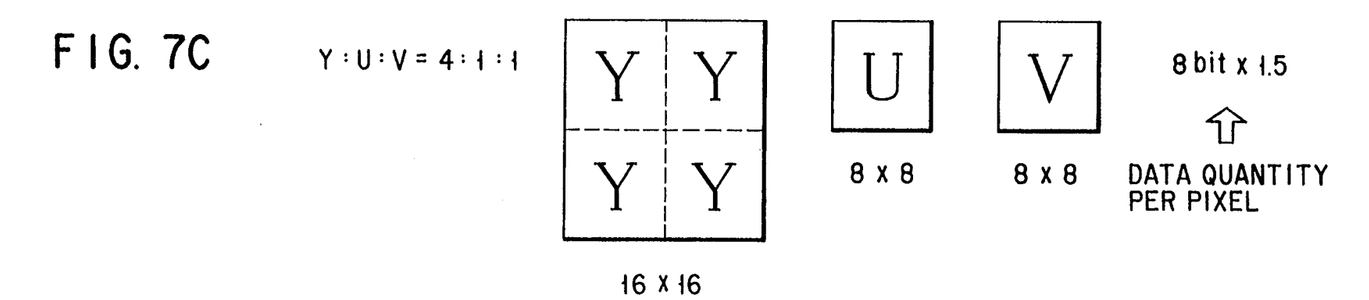

In the case of Y:U:V=4:4:4 as shown in FIG. 7A (i.e., in the absence of subsampling), the block size may remain unchanged, i.e., 8×8 pixels. In the case of Y:U:V=4:2:2 as shown in FIG. 7B, a block is considered to have a size of 16×8 pixels. In the case of Y:U:V=4:1:1 as shown in FIG. 7C, a block is considered to have a size of 16×16 pixels. The editing process is the same as that described above, except the block size.

Now, cut and paste editing of images according to the present invention will be described referring to FIGS. 8A to 8D, 9A to 9D, 10A to 10C and 11A to 11C.

Figure 8A:
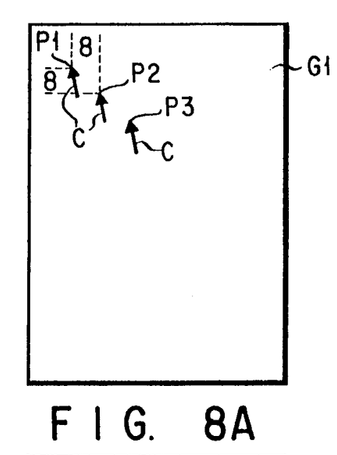
FIGS. 8A to 8D and FIGS. 10A to 10C are diagrams for use in explanation of image cut off and image paste according to one embodiment of the invention when cut and paste edifying is performed.
Figure 8B:
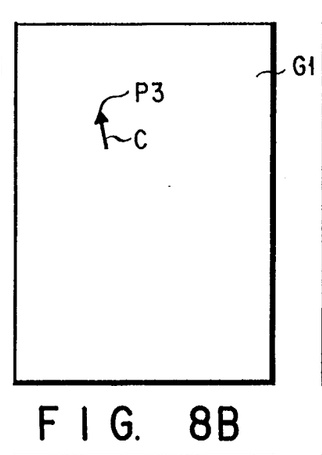
Figure 8C:
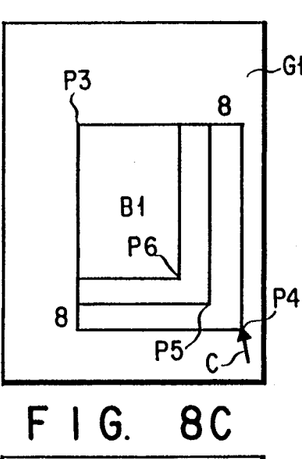
Figure 8D:
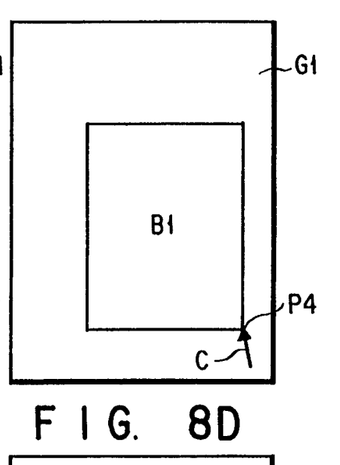

FIGS. 8A to 8D show one example of image cut out operation in which an image is cut out along the block boundaries. Since the image is cut out along the block boundaries, the upper left corner or lower right corner of the rectangular cut image to be designated by a cursor will move at intervals of 8 pixels in both vertical and lateral directions, provided that each block has a magnitude of 8×8 pixels. The image cut out can be performed by designating the upper left corner and lower right corner of the image. For example, as shown in FIG. 8A, the cursor C is first positioned at P1(x,y) and is then moved to second position P2(X+8, y+8), and finally at position P3(X+16, y+16). Thus, the cursor C is not displayed at positions between P1 and P2 and P2 and P3. When the cursor C is positioned at P3 as shown in FIG. 8B, a click operation is performed at this position by means of mouse or keyboard to input this position P3 exactly as the upper left position of the cut out image. The lower right position P4 is designated in the similar manner as the upper left position P3 and the lower right corner of the cut out image B1 may be changed to positions P5 or P6 discontinuously as shown in FIG. 8C. When the click operation is performed at the position P4 as shown in FIG. 8D, the position data of the lower right corner P4 is input.

In the case of the example shown in FIGS. 8A to 8D, the cursor C moves discontinuously at intervals of 8 pixels and the positions designated by the cursor C show positions capable of being cut out. Thus, the operator can recognize exact cut out positions from the clicked cursor positions.

Figure 9A:
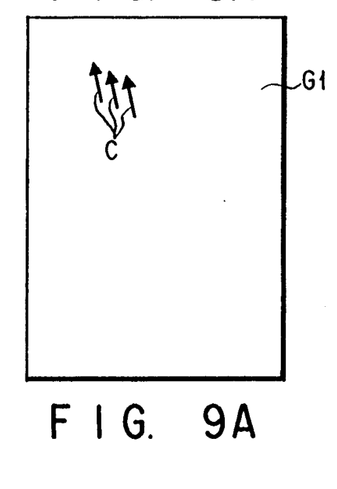
FIGS. 9A to 9D and FIGS. 11A to 11C are diagrams for explaining another example of image cut off and paste according to another embodiment of the invention.
Figure 9B:
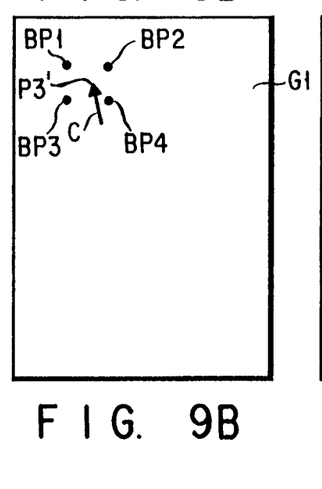
Figure 9C:
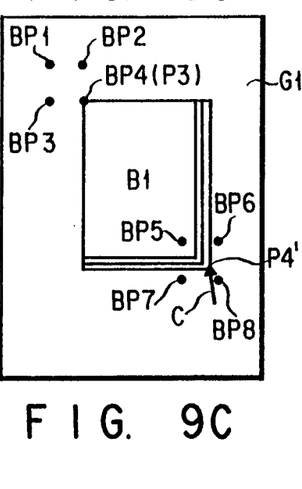
Figure 9D:
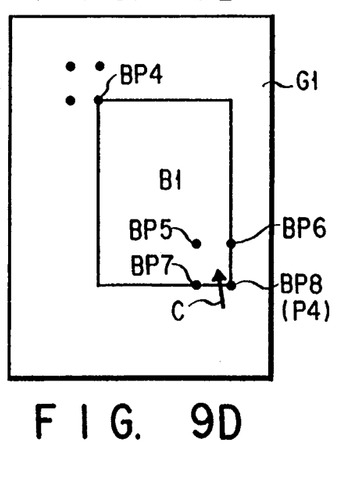

The cursor C may be moved continuously as shown in FIG. 9A unlike the case of FIG. 8A. In this case the operator cannot see the block boundary positions BP1, BP2, BP3 . . . shown in FIG. 9B. Therefore, the operator may designate by the cursor C the position P3' as the upper left corner position of an image being cut out as shown in FIG. 9B. When the cursor C is clicked at the position P3', the coordinates of the block boundary position BP4 nearest to the clicked position P3' is calculated and displayed as shown in FIG. 9C. The lower right corner of the cut out image B1 can be designated in the similar manner. When determining the lower right corner position the cursor C is continuously moved and stopped at a position P4' as shown in FIG. 9C. When the cursor C is clicked at the position P4', the coordinates of the block boundary position BP8 nearest to the clicked position P4' is calculated and displayed as shown in FIG. 9D.

In the case of the example shown in FIGS. 9A to 9D, the cursor C moves continuously regardless of the exact cut out positions or the block boundaries. When the operator designates the upper left or lower right position by the cursor C, a boundary position nearest to the clicked position is searched or calculated to determine an appropriate boundary position to be used to cut out an image. In this case the displayed positions BP4 and BP8 are slightly different from those of clicked positions P3' and P4', respectively. However, the distance between the points P3' and BP4 or between P4' and BP8 is very small. Therefore, the operator cannot recognize the shift of clicked positions and the displayed positions.

Paste operations may be performed as shown in FIGS. 10A to 10C or 11A to 11C, in which the cut out image B1 is moved in the image G2 to be used as a paste board. The paste operation of FIGS. 10A to 10C corresponds to the example of FIGS. 8A to 8D and that of FIGS. 11A to 11C to the example of FIGS. 9A to 9D.

Figure 10A:
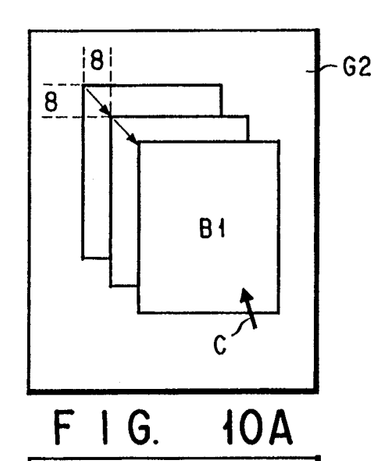
Figure 10B:
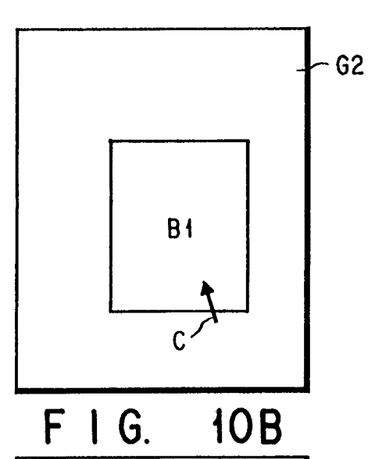
Figure 10C:
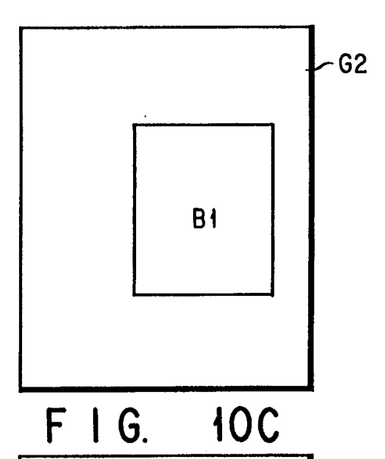

As shown in FIG. 10A, the cut out image B1 moves discontinuously at the intervals of 8 pixels in both the vertical and lateral directions. When the cursor C is clicked at the position shown in FIG. 10B, paste of image B1 is performed at the exact clicked position as shown in FIG. 10C.

Figure 11A:
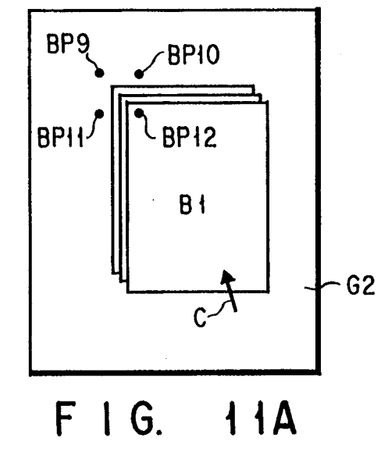
Figure 11B:
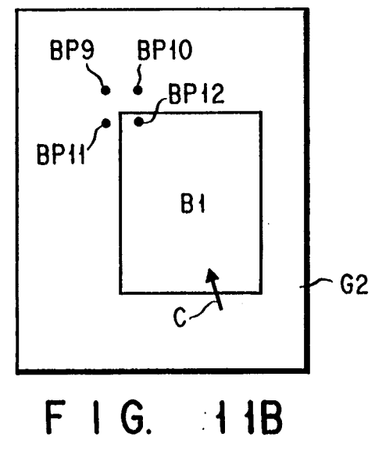
Figure 11C:
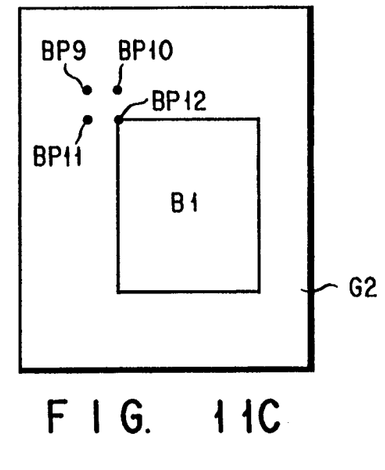

In the case of FIGS. 11A to 11C, the image B1 to be pasted is moved in the pasteboard G2 continuously as shown in FIG. 11A. When the cursor C is stopped at a position shown in FIG. 11A, the upper left corner of the image B1 is positioned at a position surrounded by the block boundary points BP9 to BP12. When click operation is performed with the cursor C positioned at a position as shown in FIG. 11B, the cut out image B1 to be pasted is moved to the position as shown in FIG. 11C in which the upper left corner position of the image B1 becomes to the boundary position BP12 nearest to the clicked inbetween position. Though the displayed position of the pasted image B1 in the pasteboard G2 is slightly different from the clicked position, the shift of the image position cannot be recognized by the operator.

As described above, according to the present invention, since the phase of a cutout image with respect to block boundaries is stored and pasting is performed in a position where phase coincidence occurs, no degradation of the quality of the cutout image due to reencoding occurs. In addition, since the cut and paste editing is performed in accordance with the boundaries of blocks for encoding, image degradation due to block phase inconsistency will not occur even if reencoding is performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:
   display means having first and second display areas for displaying an image corresponding to image data, wherein the image displayed on said first display area may be displayed on said second display area;
   encoding and decoding means for encoding image data to be displayed on said display means in units of blocks each having $m \times n$ pixels and for decoding image data of the image displayed on said display means in units of blocks each having $m \times n$ pixels;
   means for calculating values of coordinates (x, y) of a second point so as to satisfy relationships:

$$X \bmod m = x \bmod n$$

$$Y \bmod n = y \bmod n$$

where, (X, Y) represent values of coordinates of a first point of the image displayed on said first display area and (x, y) represent coordinates of the second point corresponding to the first point of the image displayed on said second display area when the image displayed on said first display area is displayed on said second display area; and
   control means for displaying the image displayed on said first display means on said second display means in accordance with the values of the second coordinates (x, y) calculated by said calculating means that the same image data in units of blocks of $m \times n$ pixels is encoded and decoded by said encoding and decoding means.

2. An image processing apparatus according to claim 1, which further comprises means for designating a first area of the image displayed on said first display area, and means for performing display operation the image corresponding to the designated first area on said second display area.

3. An image processing apparatus according to claim 1, wherein said calculating means comprises:
   first specifying means for specifying a cutout position on said first display area;
   second specifying means for specifying a paste position on said second display area;
   changing means for changing the values of said coordinates (x, y) of said paste position to the cutout position on said first display area; and
   means for taking out a cutout image from said first display area and moving the cutout image to the paste position on said second display area.

4. An image processing apparatus comprising:
   display means having first and second display areas for displaying an image corresponding to image data, wherein the image displayed on said first display area may be displayed on said second display area;
   encoding and decoding means for encoding image data to be displayed on said display means in units of blocks each having $m \times n$ pixels and for decoding image data of the image displayed on said display means in units of blocks each having $m \times n$ pixels;
   means for calculating values of coordinates (x, y) of a second point so as to satisfy relationships:

$$X \bmod m = x \bmod n$$

$$Y \bmod n = y \bmod n$$

where, (X, Y) represent values of coordinates of a first point of the image displayed on said first display area and (x, y) represent coordinates of the second point corresponding to the first point of the image displayed on said second display area;
   cursor display means for displaying a cursor on said second display area;
   cursor moving means for moving the cursor displayed on said second display area at any desired position of said second display area;
   designating means for designating a desired position on said second display area using the cursor moved by said cursor moving means;
   means for determining the second coordinates (x, y) calculated by said calculating means nearest from the desired position designated by said designating means; and
   control means for displaying the image displayed on said first display means on said second display area in accordance with the values of the second coordinates (x, y) determined by said determining means so that the same image data in units of blocks of $m \times n$ pixels is encoded and decoded by said encoding and decoding means.

5. An image processing apparatus comprising:
   display means having first and second display areas for displaying an image corresponding to image data, wherein the image displayed on said first display area may be displayed on said second display area;

encoding and decoding means for encoding image data to be displayed on said display means in units of blocks each having m×n pixels and for decoding image data of the image displayed on said display means in units of blocks each having m×n pixels;

means for calculating values of second coordinates (x, y) of a second point so as to satisfy relationships:

$$X \bmod m = x \bmod m$$

$$Y \bmod n = y \bmod n$$

where, (X, Y) represent values of coordinates of a first point of the image displayed on said first display area and (x, y) represent coordinates of the second point corresponding to the first point of the image displayed on said second display area;

cursor display means for displaying a cursor on said second display area;

cursor moving means for continuously moving the cursor displayed on said second display area at the second coordinates (x, y) calculated by said calculating means of said second display area;

designating means for designating a desired position on said second display area using the cursor moved by said cursor moving means; and control means for displaying the image displayed on said first display area on said second display area in accordance with a position designated by said designating means so that the same image data in units of blocks of m×n pixels is encoded and decoded by said encoding and decoding means.

* * * * *